United States Patent [19]

Schicketanz et al.

[11] Patent Number: 4,752,125

[45] Date of Patent: Jun. 21, 1988

[54] APPARATUS TO MEASURE FIBER DISPERSION

[75] Inventors: Dieter W. Schicketanz; Christoper K. Eoll, both of Hickory, N.C.

[73] Assignee: Siecor Corporation, Hickory, N.C.

[21] Appl. No.: 943,433

[22] Filed: Dec. 19, 1986

[51] Int. Cl.⁴ ............................................. G01N 21/84
[52] U.S. Cl. ................................................ 356/73.1
[58] Field of Search ...................................... 356/73.1

[56] References Cited

U.S. PATENT DOCUMENTS

| 4,257,707 | 3/1981 | Liertz et al. | 356/73.1 |
| 4,662,744 | 5/1987 | Coppa et al. | 356/73.1 |

FOREIGN PATENT DOCUMENTS

| 54-68657 | 6/1979 | Japan | 356/73.1 |
| 60-140136 | 7/1985 | Japan | 356/73.1 |
| 61-3023 | 1/1986 | Japan | 356/73.1 |

OTHER PUBLICATIONS

Gloge et al, "Gasa Twin-Laser Setup to Measure Mode & Material Dispersion in Optical Fibers" Applied *Optics*, vol. 13, #2, Feb. 1974, pp. 261–263.

Vella, Garel-Jones, and Lowe: "Measurement of Chromatic Dispersion of Long Spans of Single-mode Fibre: A Factory and Field Test Method," Electronics Letters, 1984, vol. 20, 167–168.

*Primary Examiner*—Vincent P. McGraw
*Attorney, Agent, or Firm*—J. David Abernethy

[57] ABSTRACT

An apparatus and method for measuring dispersion in an optical fiber including transmitting light of a first wavelength and a second wavelength through the optical fiber, measuring the difference in time required for light of the first wavelength and light of the second wavelength to traverse the fiber, and calculating the dispersion of the fiber from the two wavelengths and the time difference. Lasers may be used as light sources and an oscilloscope may be used to measure the time difference.

11 Claims, 2 Drawing Sheets

APPARATUS TO MEASURE FIBER DISPERSION

BACKGROUND OF THE INVENTION

1. Field of the Invention

The invention relates to apparatus and methods for measuring chromatic dispersion in an optical fiber.

2. Description of the Prior Art

Fiber optics is an important area in the field of modern telecommunications. If an optical signal is to be used over long distances, it is necessary to use "repeaters" to strengthen the signal at intervals. These repeaters are needed because, over long distances, the signal tends to fade, or attenuate, and in the case of digital transmission each optical pulse tends to spread out from the more compact form in which it was transmitted. The pulse spreads because light of different wavelengths travels with different velocities through optical fiber, a phenomenon that is termed dispersion. Since the speeds are different, wavelengths having higher velocity tend to move toward the front of the pulse, while wavelengths having a slower velocity move toward the rear. This causes the entire pulse to spread out, decreasing the clarity of the signal, and causing further problems if the pulse is actually intermingled with other pulses. Thus dispersion can limit the distance over which a signal can be transmitted without regeneration in a repeater. Therefore, it is desirable to be able to find out the dispersion which will occur in optical fiber.

Various methods have been used to calculate dispersion, and attempts have been made to find ways of measuring dispersion which can be used reliably in field applications, as well as the factory. One such method is described in "Measurement of Chromatic Dispersion of Long Spans of Singlemode Fiber: A Factory and Field Test Method," Electronics Letters, Volume 20, No. 4, Feb. 16, 1984, by Vella, Garel-Jones, and Lowe. The method described therein utilizes light having three discrete wavelengths and a reference fiber.

An equation which may be used to describe the time required for a pulse of light of a certain wavelength to traverse an optical fiber of a given length is $$T = A\lambda^2 + B + C\lambda^{-2}.$$

Dispersion is defined as the derivative of the time with respect to the wavelength or $D = 2A\lambda - 2C\lambda^{-3}$. Neither of these equations describes a straight line, and therefore more than two points would be needed to describe either line, since 2 points are sufficient to specify only a straight line function. For this reason, methods using light of at least three wavelengths have been necessary to find dispersion.

SUMMARY OF THE INVENTION

The basis of the invention is described in the article "Dispersion Measurement Using Only Two Wavelengths" published in Electronics Letters, Feb. 13, 1986, Vol. 22, No. 4, pp. 209-211. This article is duplicated below:

---

DISPERSION MEASUREMENT USING ONLY TWO WAVELENGTHS

D. W. Schicketanz
C. K. Eoll
SIECOR CORP.
R,D&E
Hickory, NC 28603-0489 (U.S.A.)

---

Indexing terms: Optics, Optical dispersion

A method that uses only two wavelengths to measure dispersion is presented. With this method, simple setups and fast measurements are possible. Even for a field test, the measuring time would be mainly determined by fiber preparation time.

Introduction:

There are many known methods to measure dispersion, but only a few are field usable (Raman laser /1,2/, LED method /3/, three laser methods /4/, interferometric methods /5,6/ and others /7,8/). The best known for field use is the method mentioned in /4/, where four lasers are modulated with 100 MHz; one laser is used as a reference with a reference fiber; the others are used to measure dispersion. The present method does not need a reference and uses only two lasers.

Theory:

For SM fibers optimized at 1300 nm, where modal dispersion is small compared to material dispersion, a simplified Sellmeier equation for the group delay may be used. (For dispersion-shifted fibre a different polynomial may be more appropriate, but that would only change the details of the formulas.) This equation is $$t_g = A\lambda^2 + B + C\lambda^{-2} \qquad (1)$$

In this formula, A and C are material and fiber related constants, and B is only proportional to the fiber lengths involved. By differentiating eqn. (1), the dispersion of the fibre is calculated as $$D = 2A\lambda - 2C\lambda^{-3} \qquad (2)$$

This implies that the wavelength of zero dispersion is given by $$\lambda_0^4 = C/A \qquad (3)$$

and the slope at $\lambda_0$ is $$S_0 = 8A \qquad (4)$$

By rearranging eqns. 2 and 3, the dispersions may also be written as $$D = 2A(\lambda - \lambda_0^4 \lambda^{-3}) \qquad (5)$$

To calculate the complete dispersion of a fiber, only the slope at $\lambda_0$ and $\lambda_0$ itself need to be known; that means the value of B in eq. (1) is not needed to calculate the dispersion, and a method simpler than using measurements at 3 wavelengths and solving eqn. 1 may be used. Using only two wavelengths, $\lambda_0$ may be calculated (using 1 and 3) as follows:

$$\lambda_0^4 = \lambda_1^2 \lambda_2^2 [1 - (t_1 - t_2)/A(\lambda_1^2 - \lambda_2^2)] \qquad (6)$$

where $t_1 - t_1$ (i.e. $\Delta t$) and A will be assumed to be normalized to 1 km. To use this equation to determine $\lambda_0$, A [proportional to the slope at $\lambda_0$, eqn. 4] must be known, but if $\lambda_1 < \lambda_0 < \lambda_2$, it will become evident that A needs to be known only within, say, ±20%, and it can be calculated even from theory with sufficient accuracy. Using ESI parameters for approximately step-index SM fibres and using a computer program to solve the vector field equations, the slope at $\lambda_0$ was calculated as a function of $\lambda_0$ (FIG. 1). In FIG. 1 some data measured using a Raman laser is plotted, and show good agreement.

The curves fitted to the calculations are $$S_0 = 0.47 - 0.00029 \lambda_0 \, ps/nm^2 km$$

$$\lambda_0 = [825 - 0.6514(\lambda_c + 85)]\Delta + 1273 \pm 1.5 \text{ nm} \tag{8}$$

where $\lambda_c$ is the theoretical cutoff of a fibre in nm and $\Delta$ the refractive difference in %. The ranges of validity of these curves are $1030 < \lambda_c < 1350$, $0.20 < \Delta < 0.40$, and $1280 < \lambda_0 < 1340$. A polynomial that extends the ranges of validity and gives a better fit for $\lambda_0$ in eqn. 8 is in development.

A new observation is that the slope at $\lambda_0$ depends on $\lambda_0$ in an approximately linear fashion. This may be used to solve equation (6) easily and quite accurately by iteration.

If eqn. 6 is to be used to calculate $\lambda_0$, the sensitivities of $\lambda_0$ to the different input parameters should be known. As it is cumbersome to express them in the form of formulas, three typical numerical examples where $\lambda_0$ is around 1300 nm are given in Table 1.

TABLE 1

| | | Sensitivity of $\lambda_0$ to Unit Error in Input Parameters | | | |
|---|---|---|---|---|---|
| $\lambda_1$ | $\lambda_2$ | A nm/% A | $\Delta t$ nm/(ns/km) | $\lambda_1$ nm/nm | $\lambda_2$ nm/nm |
| 1200 | 1300 | 0.6 | 100 | 1.5 | 0.25 |
| 1250 | 1300 | 0.15 | 200 | 1.25 | 0.25 |
| 1270 | 1350 | 0.01 | 150 | .5 | 0.5 |

It is easily seen that the last case is the best because the sensitivity to errors in wavelength and A is the lowest. The effect of the high sensitivity with respect to $\Delta t$ can be reduced by measuring longer systems; for example, to determine $\lambda_0$, where no individual input parameter contributes more than $\pm 1$ nm to the possible error in $\lambda_0$, $\lambda_1$ and $\lambda_2$ must be known within $\pm 2$ nm and $\Delta t$ must be known to $\pm 35$ ps for a 5 km length or to only $\pm 0.2$ ns for a 30 km length. The value of A is not critical at all.

Experiment:

A multimode fiber bandwidth setup with pulsed lasers at 1194 and 1296 nm was used. The wavelengths are not optimal (table 1) because the wavelength at 1194 should be known to $\pm 0.7$ nm, a value not easily achieved even in a lab environment. The receiver consisted of a Ge APD (Fujitsu) followed by two 5 GHz BH amplifiers. The two lasers were connected consecutively to the fiber being measured. The 7854 Tektronix oscilloscope averaged the data and then calculated the time difference between the pulses (FIG. 2). 4 different fibers were measured; the results are given in table 2 and are well within fibre specifications.

TABLE 2

| Results for Different Fibers | | | |
|---|---|---|---|
| Fibre | Manufacturer | Length km | Measured $\lambda_0$ |
| 1 | A | 7.1 | 1317 ± 2 |
| 2 | A | 7.2 | 1315 ± 2 |
| 3 | A | 10.9 | 1314 ± 2 |
| 4 | B | 2.7 | 1305 ± 2 |

The setup included a sampling oscilloscope that enables accurate time measurement but needs a pretrigger (in this case a digital delay) not possible to use in the field; however, a standard, internally triggered, 300 MHz oscilloscope with a crystal-controlled time base (e.g. Tektronix 2465, Option 9) could be used in the field to measure dispersion for lengths longer than 5 km. Two pulsed lasers would be coupled at the same time into the fiber being measured. One receiver detects the two pulses, and the time measurement is used to calculate $\lambda_0$ (FIG. 3). A similar setup working in the frequency domain is also feasible. To use standard phase measurements, a setup with vector voltmeters may be used. In any case, an easy field measurement is possible, where measurement time is limited only by fiber preparation.

Acknowledgements:

We should thank E. Buonopane and A. O. Garg for providing the bandwidth test equipment and K. McLeaster for supplying fibres 1 to 3.

References:

[1] Cohen, L. G., and Lin, C.: 'Pulse Delay Measurements in the Zero Dispersion Wavelength Region for Optical Fibers', Appl. Opt., 1977, 16, pp. 3136–3139.

[2] Lin, C., and French, W.: 'A Near IR Raman Oscillator Tuneable from 1.07 to 1.3 m', App. Phys. Lett. 39 (1979), pp. 666–668.

[3] Costa, B., Mazzoni, D., Puleo, M., and Vezzoni, E.: 'Phase Shift Technique for the Measurement of Chromatic Dispersion in Optical Fibers Using LED's', IEEE J. Quantum Electron., 1982, QE-18, pp. 1509–1515.

[4] Vella, P. J., Garel-Jones, P. M., and Lowe, R. S.: 'Measurement of Chromatic Dispersion of Long-Spans of Single Mode Fiber: a Factory and Field Test Method', Elec. Letters 1984 (20) No. 4, pp. 167–169.

[5] Saunders, M. J., and Gardner, W. B.: 'Precision Interferometric Measurement of Dispersion in Short Single Mode Fibers'. Technical digest of symposium on optical fibre measurements. Boulder, USA, 1984.

[6] Oksanen, L., and Halme, S. J.: 'Interferometric Dispersion Measurement in Single-Mode Fibers With a Numerical Method to Extract the Group Delays from the Measured Visibility Curves', Ibid., 1984.

[7] Yamada, J.: 'Simple Dispersion Measurement of a Long-Span, Single-Mode Fiber Using the Longitudinal Mode Spacing of a Semi-Conductor Laser', Opt. & Quantum Electron., 1982, 14, pp. 183–187.

[8] Lin. C., Tynes, A. R., Tomita, A., and Liu, P. L.: 'Pulse Delay Measurements in Single-Mode Fibers Using Picosecond InGaAsP Injection Lasers in the 1–3 m Spectral Region', Bell Syst. Tech. J., 1983, 62, pp. 457–462.

(end of article)

By combining equations (4) and (6), one may simplify to the equation $$\lambda_o^4 = \lambda_1^2 \lambda_2^2 \left[ 1 - \frac{8 \Delta t}{S_0 (\lambda_1^2 - \lambda_2^2)} \right]. \tag{9}$$

A more precise version of equation (8) is $S_0 = 0.46713 - 0.00029078 \lambda_0$ (10). The coupler used may be a 1300 nm 3 dB interface coupler by Amphenol Products. The Fujitsu APD (avalanche photodiode) has a risetime of 150 ps. For nominally step-index optical fibers with $\lambda_0$ in the neighborhood of 1300 nm, $\lambda_0$ and $S_0$ may be computed by using only equations (9) and (10), where $\lambda_1$ and $\lambda_2$ are the wavelengths of the lasers, and $\Delta t$ is the difference in time required for pulses from the different lasers to traverse a fiber length of one kilometer.

Equation (9) can also be used for singlemode fibers other than nominally step-index fibers optimized near 1300 nm, as well as for multimode optical fibers. The coefficients in equation (10), however, must be adjusted for those cases. These coefficients may be found by obtaining several different optical fibers of the type to be measured, finding $\lambda_0$ and $S_0$ for each individual fiber by prior art methods, and making the straight line plot similar to that as shown in FIG. 1 of applicant's article reprinted herein.

BRIEF DESCRIPTION OF THE DRAWINGS

FIG. 1, slope at $\lambda_0$ as a function of $\lambda_0$; FIG. 2, two pulses at 1194 nm and 1296 nm at end of 2.7 km of SM fibre. In this case, a fibre coupler was used to couple both wavelengths at the same time ($\Delta t=0.607$ ns/km and the time scale is 0.5 ns/div; FIG. 3, set-up to measure dispersion using only two wavelengths in time domain.

FIG. 1 shows the slope of $\lambda_0$ as a function of $\lambda_0$ as predicted by theory and experiment; x-theory, o-Raman laser measurements.

FIG. 2 shows an osciliscope image of two pulses at 1194 nm and 1296 nm at the end of 2.7 km of singlemode optical fiber (a fiber coupler being used to transmit both wavelengths simultaneously);

FIG. 3 shows apparatus to measure dispersion using only two wave-lengths in the time domain;

DETAILED DESCRIPTION OF THE PREFERRED EMBODIMENTS

Figure 1:
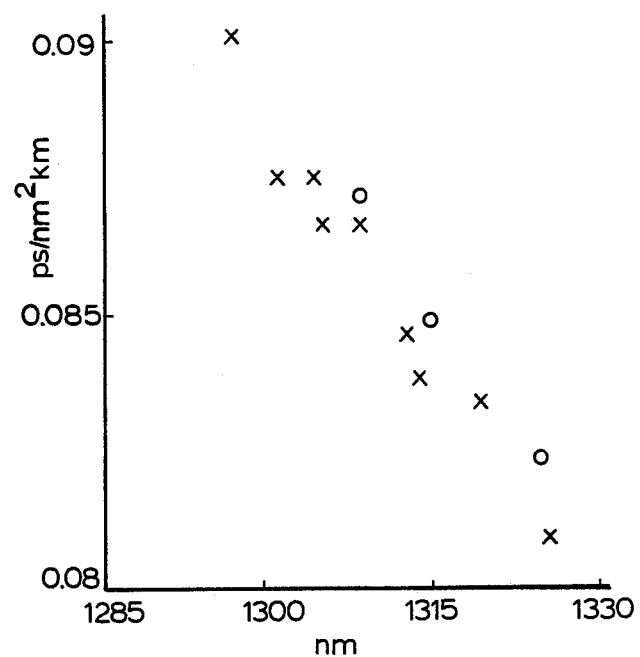
FIGS. 1-3 are the same as FIGS. 1-3 of the magazine article, "Dispersion Measurement Using Only Two Wavelengths," Electronics Letters, Feb. 13, 1980, Vol. 22 No. 4, pp. 209-211. The captions are as follows.
Figure 2:
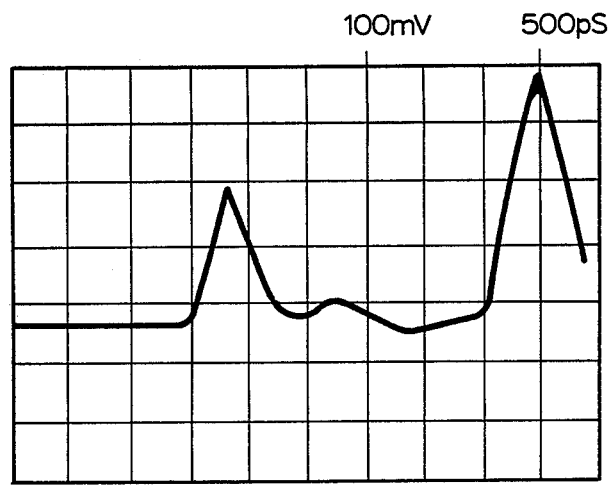

FIG. 2 illustrates the foundation of the problem to be solved by the invention. Two pulses of light having wavelengths 1194 nm and 1296 nm are injected into an optical fiber at the same time, but at the end of 2.7 kilometers of fiber, the pulses have separated by an appreciable amount. (The difference in transit time shown is 0.607 ns/km on a time scale of 0.5 nsec/div). FIG. 1 shows the slope of $\lambda_0$ as predicted by theory and experiment. $\lambda$ is used herein as a symbol for wavelength. An x indicates a point calculated from theory and an o indicates a Raman laser measurement.

Figure 3:
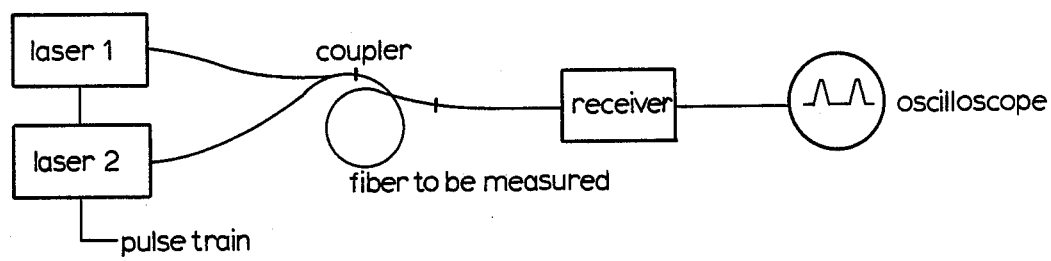

FIG. 3 shows apparatus to calculate dispersion according to the invention. In the experiment described in the article reproduced herein, Laser 1 (element 10) and Laser 2 (element 11) are pulsed lasers having wavelengths of 1194 and 1296 nm. Laser wavelengths of 1250 nm and 1350 nu are also suitable. The coupler may be a 1300 nm 3 dB interface coupler by Amphenol Products. The function of the coupler is to allow both lasers to transmit light into the tested fiber. Transmission may or may not be simultaneous; FIG. 2 shows the results of simultaneous transmission but the oscilloscope may still record the difference in transit time ($\Delta t$) of the two pulses if separate transmission is required. The optical fiber of FIG. 3 is a known length. The experiment recorded in the article reproduced herein used a fiber length of 2.7 km, but a standard length of 1 km or other lengths may be chosen.

After the pulses of light transit the optical fiber, they enter the receiver. The function of the receiver is to generate electrical signals in response to the pulses of light exiting the optical fiber, since the oscilloscope is responsive to electrical signals, not light pulses. The experiment in the magazine article reproduced herein used a GI APD (a Fujitsu avalanche photodiode with a risetime of 150 p.s.) followed by two GHz BH amplifiers.

An oscilloscope connected in series to the receiver in FIG. 3 then using these electrical signals measures only the difference in the time required for pulses of light of the first wavelength to traverse the fiber and the time required for pulses of light of the second wavelength to traverse the fiber. A standard, internally triggered 300 MHz oscilloscope with a crystal-controlled time base, such as a Tektronix 2465, option 9, may be used; the experiment used a Tektronix 7854 oscilloscope. The latter model may be used with a programmed computer.

Figure 4:
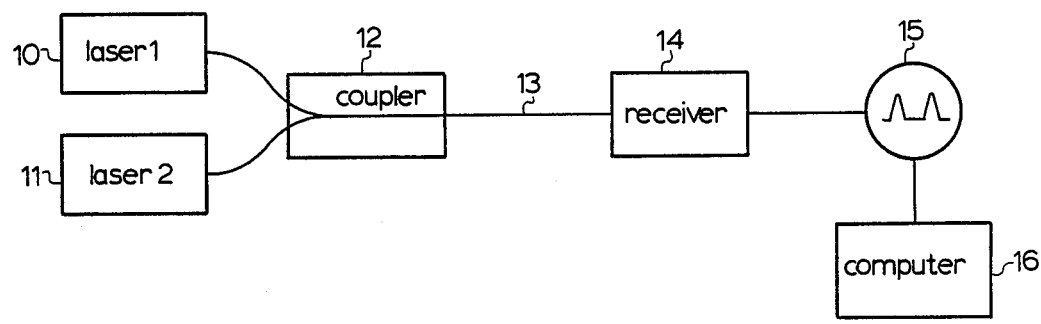
FIG. 4 shows an augmented setup including a computer to calculate the desired values.
Figure 5:
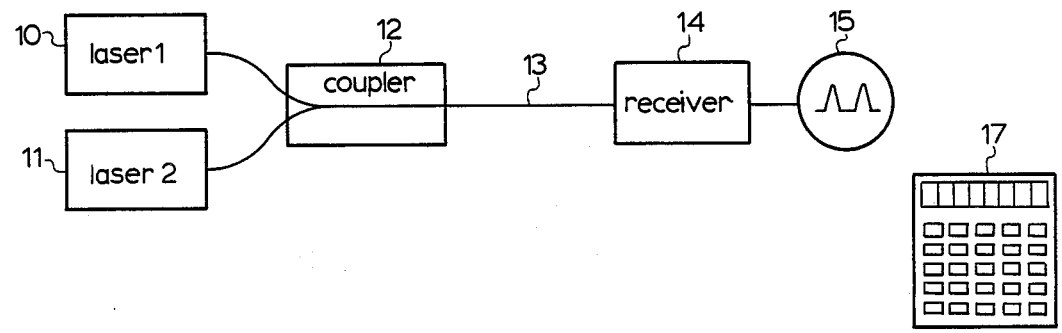
FIG. 5 shows a handheld calculator for use with the apparatus of FIG. 3.

Finally, dispersion must be calculated. Computer 16 connected in series to oscilloscope 15 may be used as in FIG. 4, or the difference in transit time of the pulses may be entered into handheld calculator 17 as in FIG. 5. In either case, the equations disclosed herein are then sufficient for calculation of dispersion using only the values of the two pulse wavelengths and the difference in transit time of the pulses. In FIGS. 4 and 5, elements 10 and 11 are first and second lasers, element 12 is a coupler and element 14 is a receiver, all connected in series via optical fiber 13. In each case, the receiver and oscilloscope are connected by an electrical connection, not an optical fiber.

To make the invention more accessible to those who are not computer experts, the inventors' computer program is now set out using laser wavelengths 1200 and 1300 nm.

```
10   !PROG FOR TEK OSC 7854
20   OUTPUT 709;"1 0 2 4 >P/W STORED DOTS OFF "
     !ADRESS 9
30   OUTPUT 709;"5 0 AVG      " !ADRESS 9
40   OUTPUT 709;". 3 SMOOTH   " !ADRESS 9
50   OUTPUT 709;"CRS1 0 >HCRD"  !ADRESS 9
60   OUTPUT 709;". 0 0 0 0 0 0 0 0 5 > HCRD" !ADRESS 9
70   OUTPUT 709;"MIN >VCRD CRS2-1" !ADRESS 9
80   OUTPUT 709;"0 >HCRD CRS1 "  !ADRESS 9
90   OUTPUT 709;"0 >HCRD       " !ADRESS 9
100  OUTPUT 709;"MIN >VCRD    "  !ADRESS 9
110  OUTPUT 709;"CRS2-1        " !ADRESS 9
120  OUTPUT 709;"HCRD SENDX"
130  ENTER 709;A
140  REM THIS PART FOR CALCULATION
150  A=A/Length
160  L1=1200
170  L2=1300    !   LASER WAVELENGTH
180  L0=1300    !   STARTING VALUE
190  Slope=.4671-2.908E-4*L0
200  H0=(L1*L2) 2*(1-A/(Slope*(L1*L1-L2*L2)/8))
210  H0=SQR(SQR(H0))
220  IF ABS(L0-H0)>.01 THEN
230  L0=H0
240  GOTO 190
250  END IF
260  PRINT H0
270  PRINT Slope
```

| | |
|---|---|
| 280 | END |

Note steps 10 to 130 result in finding the difference in transit time of the light pulses, or $\Delta t$, $\Delta t$ being x in step 120 and A in step 130. Steps 140 through 280 calculate $\lambda_0$ and $S_0$ by the iteration process described, H0 in step 260 being $\lambda_0$ and Slope in step 270 being $S_0$. Now use equation (5), $D=2A(\lambda-\lambda_0^4\lambda^{-3})=S_0(\lambda-\lambda_0^4\lambda^{-3})/4$; D may thus be found for any wavelength $\lambda$ required.

An example of a computer which may be used as shown in FIG. 4 is a Hewlett Packard HP 71 B or any other computer complying with IEEE 488 standards in conjunction with a HP IL to HPIB connector.

What is claimed is:

1. A process for measuring dispersion in an optical fiber comprising the steps of:
   (a) providing an optical fiber;
   (b) transmitting pulses of light of a first wavelength and transmitting pulses of light of a second wavelength through the optical fiber;
   (c) generating electrical signals in response to the pulses of light after first and second wavelengths exiting the optical fiber;
   (d) measuring by use of the electrical signals only the difference in the time required for pulses of light of the first wavelength to traverse the fiber and the time required for pulses of light of the second wavelength to traverse the fiber; and
   (e) machine calculating the wavelength of zero dispersion, $\lambda_0$, and the derivative of dispersion with respect to wavelength at $\lambda_0$ of the optical fiber from the values of the wavelengths in step (b) and the time difference measured in step (d).

2. A process of measuring dispersion in an optical fiber as recited in claim 1, wherein:
   (a) a first laser is used to transmit pulses of light having the first wavelength and a second laser is used to transmit pulses of light having the second wavelength.

3. A process of measuring dispersion in an optical fiber as recited in claim 1, wherein:
   (a) the measuring step comprises using an oscilloscope responsive to the electrical signals.

4. A process of measuring dispersion in an optical fiber as recited in claim 1, wherein:
   (a) an electronic computer is used to perform said calculating step.

5. A process of measuring dispersion in an optical fiber as recited in claim 1, wherein the optical fiber is a nominally step index optical fiber with zero dispersion between 1,280 and 1,340 nanometers.

6. A process of measuring dispersion in an optical fiber as recited in claim 3, wherein the optical fiber is a multimode optical fiber.

7. Apparatus for measuring dispersion in an optical fiber, comprising:
   (a) first means for transmitting pulses of light of first and second wavelengths into a first end of the optical fiber;
   (b) an optical receiver responsive to pulses of light transmitted by the first means exiting the optical fiber for generating electrical signals;
   (c) second means responsive to electrical signals generated by the optical receiver for measuring only the difference in the time required for pulses of light of the first wavelength to traverse the optical fiber and the time required for pulses of light of the second wavelength to traverse the optical fiber; and
   (d) third means for machine calculating the wavelength of zero dispersion, $\lambda_0$, and the derivative of dispersion with respect to wavelength at $\lambda_0$ of the optical fiber using the values of the first and second wavelength and the time difference measured by the third means.

8. Apparatus for measuring dispersion in an optical fiber as recited in claim 7, wherein:
   (a) said first means comprises a first laser transmitting pulses of light of the first wavelength and a second laser transmitting pulses of light of the second wavelength.

9. Apparatus for measuring dispersion in an optical fiber as recited in claim 8, wherein:
   (a) said first means for transmitting pulses of light of first and second wavelengths further comprises an optical coupler for forming transmission paths for conveying pulses of light from the first and second lasers into the first end of the optical fiber.

10. Apparatus for measuring dispersion in an optical fiber as recited in claim 7, wherein:
    (a) said second means comprises an oscilloscope.

11. Apparatus for measuring dispersion in an optical fiber as recited in claim 7, wherein said third means comprises an electronic computer.

* * * * *